United States Patent Office 2,978,504
Patented Apr. 4, 1961

2,978,504

ALIPHATIC NITRAMINES

Milton B. Frankel, Pasadena, and Karl Klager, Monrovia, Calif., assignors to Aerojet-General Corporation, Azusa, Calif., a corporation of Ohio No Drawing. Filed Oct. 25, 1954, Ser. No. 464,613

5 Claims. (Cl. 260—583)

This invention relates to new compositions of matter and a method for their preparation. In particular this invention relates to nitramines having the general formula:

$$NO_2-NH-A-CH_2-\underset{\underset{NO_2}{|}}{\overset{\overset{NO_2}{|}}{C}}-CH_2-A-NH-NO_2$$

wherein A is an alkylene radical.

Due to their high oxygen content, these compounds are excellent high explosives, a third more powerful than TNT. They also find valuable use as oxygen donating additives for propellant fuels.

The compounds of this invention are readily prepared by hydrolyzing dinitro dinitramides, in accordance with the general reaction scheme set forth below:

$$R-\overset{\overset{O}{\|}}{C}-\underset{\underset{}{|}}{\overset{\overset{NO_2}{|}}{N}}-A-CH_2-\underset{\underset{NO_2}{|}}{\overset{\overset{NO_2}{|}}{C}}-CH_2-A-\underset{\underset{}{|}}{\overset{\overset{NO_2}{|}}{N}}-\overset{\overset{O}{\|}}{C}-R \longrightarrow$$

$$NO_2-NH-A-CH_2-\underset{\underset{NO_2}{|}}{\overset{\overset{NO_2}{|}}{C}}-CH_2-A-NH-NO_2$$

wherein A is an alkylene radical and R is an alkyl radical.

Amides undergo hydrolysis under either acid or basic conditions. Optimum results were obtained when the reaction was conducted in an ammoniacal media.

The amides useful as starting materials for this invention are prepared by condensing acyl anhydrides with the dinitro alkyl diamines and subsequently reacting the condensation product with nitric acid, as disclosed in our copending application No. 464,612, filed October 25, 1954.

To more clearly illustrate this invention, the following example is presented. It is to be understood, however, that this example is presented merely as a means of illustration, and is not intended to limit the scope of the invention in any way.

EXAMPLE I

*Preparation of 3,3-dinitro-1,5-pentane dinitramine*

To 10 gm. (0.0027 mole) of 3,3-dinitro-N,N'-dinitro-N,N'-diacetyl-1,5-pentane diamine was added 25 ml. of 28% ammonium hydroxide. The solid immediately dissolved with the evolution of heat to form a yellow solution. The solution was cooled and acidified with concentrated hydrochloric acid causing a yellow oil to form. The reaction mixture was extracted with ether, washed with water, dried and concentrated to yield a yellow oil which upon the addition of chloroform crystallized into a white solid. The product was then recrystallized from ether to yield a white solid having a M.P. of 67–68° C. and exhibiting an impact stability of 30–35 cm./2 kg. The elemental analysis of the product is as follows:

Calculated for $C_5H_{10}N_6O_8$: percent C, 21.28; percent H, 3.57; percent N, 29.79. Found: percent C, 21.40; percent H, 3.72; percent N, 30.43.

The heat of combustion of the compound was calculated to be 2725 cal./gm. and was found to be 2681 cal./gm. The explosive values of the compound have been calculated to be:

Lead block value _____ 132 TNT=100
Ballistic mortar value _____ 142 TNT=100

We have also found that nitramides such as N,N'-dinitro - N,N' - dipropanoyl - 5,5 - dinitro - 1,9 - nonane diamine, N,N' - dinitro - N,N' - dihexaneoyl - 6, 6 - dinitro - 1,11 - undecane diamine and N,N' - dinitro - N,N'-dipropanoyl - 4,4 - dinitro - 1,7 - heptane diamine, readily hydrolyze in the presence of ammonium hydroxide to form the corresponding dinitramines, namely, 5,5-dinitro-1,9-nonane dinitramine, 6,6-dinitro-1,11-undecane dinitramine and 4,4-dinitro-1,7-heptane dinitramine.

It is apparent that any member of this disclosed series of nitramines may be readily prepared by subjecting the appropriate nitramide to hydrolysis, in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

We claim:

1. As compositions of matter, polynitro nitramines having the general formula:

$$NO_2-NH-A-CH_2-\underset{\underset{NO_2}{|}}{\overset{\overset{NO_2}{|}}{C}}-CH_2-A-NH-NO_2$$

wherein A is a lower alkylene radical.

2. As a composition of matter, 3,3-dinitro-1,5-pentane dinitramine having the structural formula:

$$NO_2-NH-CH_2CH_2-\underset{\underset{NO_2}{|}}{\overset{\overset{NO_2}{|}}{C}}-CH_2CH_2-NH-NO_2$$

3. The method of preparing nitramines having the general formula:

$$NO_2-NH-A-CH_2-\underset{\underset{NO_2}{|}}{\overset{\overset{NO_2}{|}}{C}}-CH_2-A-NH-NO_2$$

which comprises hydrolyzing nitramides having the general formula:

$$R-\overset{\overset{O}{\|}}{C}-\underset{\underset{}{|}}{\overset{\overset{NO_2}{|}}{N}}-A-CH_2-\underset{\underset{NO_2}{|}}{\overset{\overset{NO_2}{|}}{C}}-CH_2-A-\underset{\underset{}{|}}{\overset{\overset{NO_2}{|}}{N}}-\overset{\overset{O}{\|}}{C}-R$$

wherein A is a lower alkylene radical and R is a lower alkyl radical.

4. The method of preparing nitramines having the general formula:

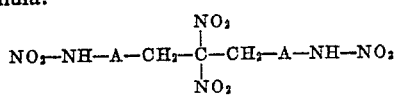

which comprises hydrolyzing nitramides having the general formula:

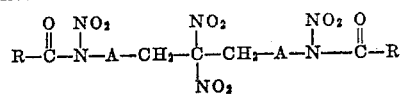

wherein A is a lower alkylene radical and R is a lower alkyl radical, in an ammoniacal media.

5. The method of preparing 3,3-dinitro-1,5-pentane dinitramines which comprises hydrolyzing 3,3-dinitro-N,N'-dinitro-N,N'-dinitro-acetyl-1,5-pentane diamine in an ammoniacal media.

No references cited.